United States Patent
Campbell

(10) Patent No.: US 6,767,659 B1
(45) Date of Patent: Jul. 27, 2004

(54) BACKSIDE RADIATIVE COOLED CERAMIC MATRIX COMPOSITE COMPONENT

(75) Inventor: Christian X. Campbell, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/375,644

(22) Filed: Feb. 27, 2003

(51) Int. Cl.[7] .............................. B32B 9/04; F02B 75/08
(52) U.S. Cl. ....................... 428/701; 428/702; 428/699; 428/697; 128/668
(58) Field of Search ................................ 428/701, 702, 428/699, 697; 123/668

(56) References Cited

U.S. PATENT DOCUMENTS

| | | |
|---|---|---|
| 5,296,288 A | 3/1994 | Kourtides et al. |
| 5,581,998 A * | 12/1996 | Craig |
| 5,736,248 A * | 4/1998 | Solntsev et al. |
| 6,013,592 A | 1/2000 | Merrill et al. |
| 6,197,424 B1 | 3/2001 | Morrison et al. |
| 6,235,370 B1 | 5/2001 | Merrill et al. |

OTHER PUBLICATIONS

Wessix, Inc., Marketing Brochure, website address: wessex-inc.com printed Sep. 17, 2002, copyright 2001, 8 pages.

* cited by examiner

Primary Examiner—Jennifer McNeil

(57) ABSTRACT

An article comprising a ceramic matrix composite component of a gas turbine engine such as a combustion liner this is adapted for backside radiative cooling is provided. The article comprises a ceramic matrix composite composition having a frontside and a backside, and coated with a ceramic insulating material on the frontside and coated with a high temperature emissive material on the backside; and a metal element spaced apart from the ceramic matrix composition and defining a gap between the metal element and the ceramic matrix composite, whereby at least a portion of thermal energy exposed to the ceramic insulating material is emitted from the high temperature emissive material through the gap to the metal element.

24 Claims, 1 Drawing Sheet

US 6,767,659 B1

BACKSIDE RADIATIVE COOLED CERAMIC MATRIX COMPOSITE COMPONENT

FIELD OF THE INVENTION

This invention relates generally to the field of temperature resistant components and in particular, to an article comprising a ceramic matrix composite component of a gas turbine engine such as a combustion liner adapted for backside radiative cooling.

BACKGROUND OF THE INVENTION

Gas turbine engines are known to include a compressor section for supplying a flow of compressed combustion air, a combustor section for burning fuel in the compressed combustion air, and a turbine section for extracting thermal energy from the combustion air and converting that energy into mechanical energy In the form of a rotating shaft. Many components that form the combustor and turbine sections are directly exposed to hot combustion gasses, for example, the combustor liner, the transition duct between the combustor and turbine sections, and the turbine stationary vanes and rotating blades and surrounding ring segments.

It is also known that increasing the firing temperature of the combustion gas can increase the power and efficiency of the combustion turbine. Modem high efficiency combustion turbines have firing temperatures that exceed temperatures of about 1,600° C., and even higher firing temperatures are expected as the demand for even more efficient engines continues. Thus, the cobalt and nickel based superalloy materials traditionally used to fabricate the structural gas turbine components must be aggressively cooled and/or insulated from the hot gas flow in order to survive long term operation in the aggressive high temperature combustion environment.

Ceramic matrix composite (CMC) materials have many potential applications in high temperature environments due to their ability to withstand and operate at temperatures in excess of those allowed for a non-insulated superalloy component. However, oxide and non-oxide CMC's characteristically can survive temperatures in excess of about 1,200° C. for only limited time periods in a combustion environment. Furthermore, oxide-based CMC's cannot be cooled effectively with active cooling systems due to their low thermal conductivity and their limitations in cooling fluid path design due to manufacturing constraints. For example, convective cooling requires a precise amount of cooling air to flow across the backside of the component; however, although this can be done with appreciable difficulty by controlling air flow splits via sizing cooling air exit holes, undesirable air leakage can often result which is difficult to inhibit if not prevent. For another example, convective cooling causes continuous airflow that can cause thermal shock conditions. Moreover, although non-oxide based CMCs can be aggressively cooled to withstand temperatures above about 1200° C., they are subject to environmental degradation that limits their useful life. Thus, to increase the operating temperature range and useful life for CMC components, a high temperature ceramic insulation can be used. However, use of such insulation to cover the CMC substrate does not resolve need to cool the CMC substrate.

Accordingly, there is a need to enhance the operation of CMC structural gas turbine components in a high temperature environment. There is also a need to cool a CMC substrate in an easy and inexpensive manner.

SUMMARY OF THE INVENTION

Accordingly, an enhanced operation of CMC structural gas turbine components in a high temperature environment is provided. An easy and inexpensive method of cooling a CMC substrate is also provided, as well an accompanying article of manufacture.

One aspect of the present invention involves an article of manufacture, comprising a ceramic matrix composite composition having a frontside and a backside, and coated with a ceramic insulating material on the frontside and coated with a high temperature emissive material on the backside; and a metal element spaced apart from the ceramic matrix composition and defining a gap between the metal element and the ceramic matrix composite, whereby at least a portion of thermal energy exposed to the ceramic insulating material is emitted from the high temperature emissive material to the metal element.

Another aspect of the present invention involves a component of a gas turbine engine, comprising: a ceramic matrix composite composition having a frontside and a backside, and coated with a ceramic insulating material on the frontside and coated with a temperature emissive coating on the backside; and a conductive metal element spaced apart from the ceramic matrix composition and defining an air gap between the metal element and ceramic matrix composite.

Another aspect of the present invention involves a combustion liner adapted for use in a combustion turbine engine, comprising: a ceramic matrix composite composition having a frontside and a backside, and coated with a ceramic insulating material on the frontside and coated with a temperature emissive coating on the backside; a metal element spaced apart from the ceramic matrix composition and defining an air gap between the metal material and ceramic matrix composite; and a platform adapted to secure the ceramic matrix composition relative to the metal element and to maintain the air gap.

BRIEF DESCRIPTION OF THE DRAWINGS

These and other advantages of the invention will be more apparent from the following description in view of the drawings that include.

DETAILED DESCRIPTION OF THE INVENTION

The invention described herein employs several basic concepts. For example, one concept relates to a temperature resistant gas turbine engine component. Another concept relates to a gas turbine engine component adapted for radiative cooling.

The present invention is disclosed in context of use as a backside radiative cooled CMC combustion liner 2 within a gas turbine engine. The principles of the present invention, however, are not limited to combustion liners 2 or even gas turbine engine components. For example, the principles of the present invention can be used to fabricate other gas turbine components, such as transition ducts, blades, vanes and ring segments. For another example, the principles of the present invention can be used with aerospace applications, such as airplanes with turbine engines and reentry space vehicles having heat shields. For another example, the principles of the present invention can be used with materials other than CMC such as metals, and can be used with other cooling schemes such as frontside cooling and impingement cooling. One skilled in the art may find additional applications for the apparatus, processes, systems, components, configurations, methods, and applications disclosed herein. Thus, the illustration and description of the present invention in context of an exemplary backside cooled CMC combustion liner 2 within a gas turbine engine is merely one possible application of the present invention.

Figure 1:
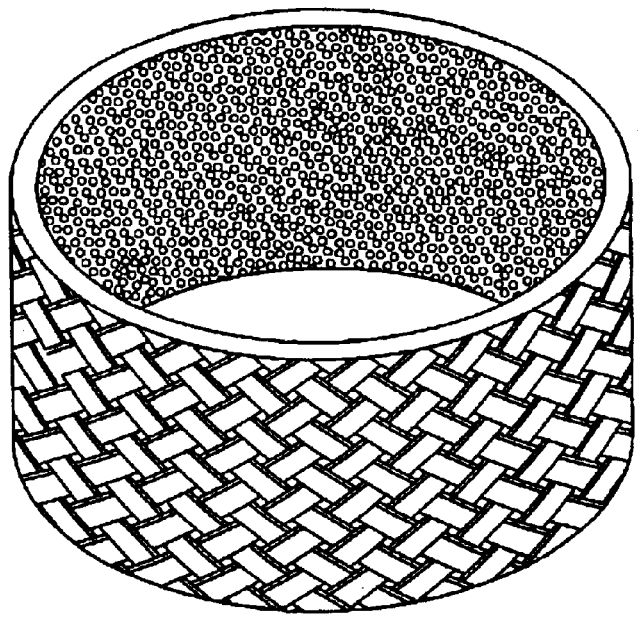
FIG. 1 is a perspective view of an exemplary gas turbine combustion liner of the present invention adapted for backside radiative cooling.
Figure 2:
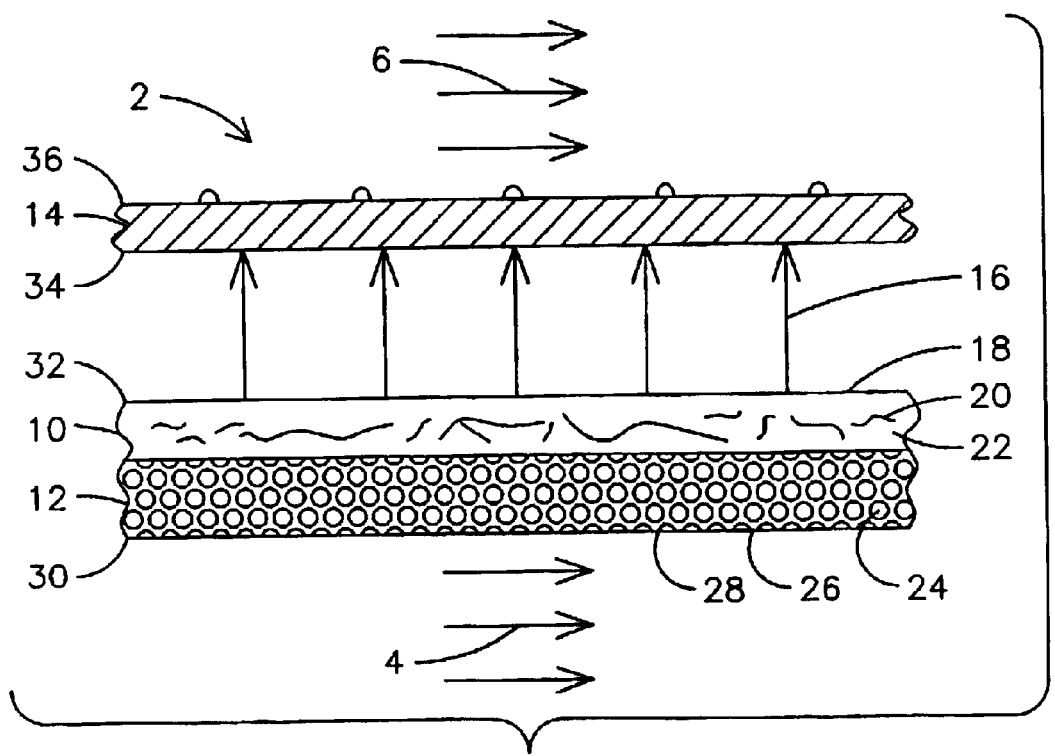
FIG. 2 is a detail cross-sectional view of the combustion liner of FIG. 1 formed of an oxide ceramic matrix composite substrate covered with a ceramic oxide insulating substrate, and separated from a metal liner by an air gap.

Referring now to FIGS. 1 and 2, an exemplary backside radiatively cooled combustion liner 2 is provided. The combustion liner 2 is advantageously formed of a CMC substrate material component 10 that is thermally protected by a ceramic insulating coating material 12 on a frontside 30 and having a spaced apart metal element 14 toward a backside 32. An air gap 16 is disposed in the space between the CMC component 10 and the metal element 14. A high temperature emissive coating 18 is applied to the backside 32 of the CMC component 10 to augment radiant cooling of the CMC component 10.

The CMC component material 10 provides requisite mechanical strength to withstand the thermal and mechanical stresses placed upon the combustion liner 2 during gas turbine engine operation and cycling. The CMC material 10 may be of tie type described in United States pending patent applications Ser. No. 09/631,097 filed Aug. 2, 2000, 09/962,733 filed Sep. 24, 2001, and 09/963,278 filed Sep. 26, 2001, each of the pending patent applications which are incorporated by reference in their entirely herein. The CMC material 10 may include any fiber-reinforced ceramic matrix material as may be known or later developed in the art of structural ceramic materials. The fibers 20 may be oxide ceramics, non-oxide ceramics, or a combination thereof. For example, the oxide ceramic fiber composition can include those commercially available from the Minnesota Mining and Manufacturing company under the trademark Nextel, including Nextel 720 (alumino-silicate), Nextel 610 (alumina), and Nextel 650 (alumina and zirconia). For example, the non-oxide ceramic fiber composition can include those commercially available from the Dow Corning corporation under the trademark Sylramic (silicon carbide), and from the Nippon Carbon corporation limited under the trademark Nicalon (silicon carbide). The matrix material composition 22 that surrounds the fibers 20 may be made of an oxide or non-oxide material such as alumina, mullite, aluminosilicate, ytrria alumina garnet, silicon carbide, silicon nitride, silicon carbonitride, molydisilicide, and the like. A CMC material 10 that combines a matrix composition with a reinforcing phase of a different composition (such as mullite/silica) or of the same composition (alumina/alumina or silicon carbide/silicon) could also be used. The fibers 20 may be continuous or long discontinuous fibers, and may be oriented in a direction generally parallel perpendicular or otherwise disposed relative to the major length of the CMC material 10. The matrix composition 22 may further contain whiskers, platelets, particulates, or fugatives therein. The reinforcing fibers 20 may be disposed in the matrix material 22 in layers, with the plies of adjacent layers being directionally oriented to achieve a desired mechanical strength. The CMC material 12 thickness is advantageously about 0.5–20 mm, preferably about 2–6 mm for use in connection with the exemplary combustion liner application, however, other applications could use a thickness that is appreciably greater or less.

The ceramic insulating coating material 12 provides requisite thermal protection to withstand the temperatures placed upon the combustion liner 2 during gas turbine engine operation and cycling. The ceramic insulation 12 may be of the type described in U.S. Pat. Nos. 6,013,592, 6,197,424 and 8,235,370, and pending U.S. patent applications Ser. Nos. 09/467,237 filed Dec. 7, 2000 and 09/536,742 filed Mar. 28, 2001, each of the patents and pending patent applications which are incorporated by reference in their entirely herein. The ceramic insulation 12 may include a plurality of oxide geometric shapes 24 that are surrounded by a filler 26 and a binder 28. For example, the oxide can comprise a mullite, alumina or zirconia composition, and the geometric shapes can comprises hollow spheres of various sizes. For example, the filler 26 may be a mullite or alumina based powder. For example, the binder 28 may be a phosphate or alumina based composition. Also, one or more optional oxide bond layers (not shown) may be disposed between the ceramic matrix composite substrate 12 and the ceramic insulating coating 14 and may comprise one or more of the group of ceramic, glass or a combination thereof, for example mullite, alumina, zirconia, and/or one or more glass. The ceramic insulating coating 12 thickness is advantageously about 2–15 mm, preferably about 3–8 mm.

A high temperature emissive coating 18 is applied to at least a portion of the backside 32 of the CMC substrate 10 to augment the amount of thermal energy emitted from the CMC substrate 10 to the air gap 16. The emittance or emissivity of the coating 18 (i.e. absorption of thermal energy and subsequent release of such thermal energy back out from the surface of the coating) to the air gap 16 is advantageously greater than about 0.5 at 1,000° C., preferably about 0.6 to about 1.0 at 1,000° C. Suitable emissive coatings 18 include that described in U.S. Pat. No. 5,296,288 which is incorporated by reference in its entirely herein, EMISSHIELD® which is commercially available from Wessex, Inc., oxidized thin metals such as CoNiOx, and the like. For example, the emissive coating may comprise a ceramic such as silicon dioxide with an emissivity agent such as silicon tetraboride. The emissive coating thickness is advantageously less than about 0.5 mm, preferably less than about 0.1 mm.

A metal element 14 adapted to resist temperatures of at least 400° C. and to conduct thermal energy provides a spaced apart backing to the CMC component 10 and forms an air gap 16 between the metal element 14 and CMC component 12. The air gap 16 is advantageously about 0.5–5 mm, preferably about 1–3 mm, and the metal element 14 is advantageously about 1–20 mm, preferably about 2–10 mm. An optional platform, sleeve or spacer with or without fasteners (not shown) can be used to help secure the metal element 14 relative to the CMC component 10 while maintaining the air gap 16 at a constant dimension, however, since the air gap 16 thickness need not be uniform and can even be zero at some places (i.e. portions of the metal element 14 can contact portions of the CMC component 10) no such spacing element is required. Suitable metal compositions include steel and superalloys such as nickel and cobalt based compositions for example Ni—Cr—Al—Co—Ta—Mo—W and combinations thereof. Also, the gap 16 need not be occupied by air, but rather can be occupied with other radiable substances such as nitrogen or carbon dioxide.

By this above-described configuration, a radiatively cooled combustion liner 2 is provided. Referring still to FIG. 2, during combustion turbine operation, hot combustion gases 4 flow along the frontside 30 of the ceramic insulated 12 CMC component 10. Heat from the combustion gases 4, slowed by the ceramic insulation 12, propagates to the lower temperature CMC material 10. The emissive coating 18 on the backside 32 of the CMC component 10 then radiates at least some of the heat from the CMC component 10 through the air gap 16 to the frontside 34 of the metal element 14. Cooling air 6 flowing along the backside 36 of the metal element 14 is conducted through the, metal element 14 to cool the metal element 14, thereby enhancing the operation of the combustion liner 2 and cooling the combustion liner 2 in an easy and inexpensive manner.

This backside cooling of the CMC material 10 thus generally involves the passage of cooling fluid 6 over or toward a backside of a component 2 that has a frontside exposed to high temperatures. The cooling fluid 6 in backside cooling schemes may be compressed air that has been extracted from the compressor or steam that is available from other fluid loops in a combustion turbine power plant. Beneficially, backside cooling does not affect the exhaust gas composition or the flow of air over an airfoil component, does not dilute the hot combustion air with colder fluid, and can generally be supplied at a lower pressure that would be needed for other cooling techniques such as film cooling. Additional benefits of backside radiative cooling of the CMC material 10 as described above can include the relative ease of controlling such a cooling scheme, as well as the ability of the cooling scheme to selectively function only when the CMC substrate 10 needs to be cooled (i.e. when it is hot and radiating thermal energy). Use of a high temperature emissive coating 18 as described above advantageously further allows the CMC material 10 to more efficiently emit the thermal energy than if no such coating was applied to the CMC material 10. However, backside cooling does create a temperature gradient across the thickness of the cooled material 10, and thus becomes decreasingly effective as the thickness of the material 10 increases and as the thermal conductivity of the material 10 decreases.

During typical gas turbine operation, the combustion gas temperature is about 1400–1700° C. or greater, with the CMC material 10 normally reaching temperatures of about 900–1200° C., and the metal element 14 normally reaching temperatures of about 400–700° C. The temperature of the cooling air 6 that flows along the backside 36 of the metal element 14 is normally about 300–600° C. and bled from the compressor.

In other or additional applications of the present invention, an emissive coating (not shown) adapted for application onto metal, such as commercially available high temperature black paint, can be optionally coated on the frontside 38 of the metal element 14. Such emissive coating should have an emittance or emissivity advantageously greater than about 0.6 at 1,000° C., preferably about 0.8 to about 1.0 at 1,000° C. The air gap 16 can also be optionally adapted such that it is nonexistent, with the metal element 14 completely contacting the CMC material 10, however, such a construction should address the thermal expansion differential between the CMC material 10 and metal element 14. Also, the metal element 14 could be completely omitted such that the backside radiative cooling scheme becomes more akin to a conventional convective backside impingement cooling scheme.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An article of manufacture, comprising:
   a ceramic matrix composite composition having a frontside in direct contact with a high temperature environment and a backside, and coated with a ceramic insulating material on the frontside and coated with a high temperature emissive material on the backside; and
   a metal element spaced apart from the ceramic matrix composition and defining a gap between the metal element and the ceramic matrix composite,
   whereby at least a portion of thermal energy exposed to the ceramic insulating material is emitted from the high temperature emissive material to the metal element.

2. The article of claim 1, wherein the ceramic composition comprises a ceramic fiber reinforced ceramic matrix material.

3. The article of claim 1, wherein the ceramic insulating material comprises a plurality of oxide geometric shapes surrounded by a filler and a binder.

4. The article of claim 1, wherein the emissive material comprises a ceramic composition and an emissive coating.

5. The article of claim 4, wherein the ceramic composition is silicon dioxide and an emissivity agent of the emissive material is silicon tetraboride.

6. The article of claim 1, wherein the metal element comprises a superalloy.

7. The article of claim 1, wherein a quantity of air is located within the gap.

8. The article of claim 1, wherein the metal element has a frontside and a backside.

9. The article of claim 8, whereby cooling air exposed to the backside of the metal element is from the frontside of the metal element to the gap to cool the ceramic matrix composite composition.

10. The article of claim 1, wherein the ceramic matrix composition is attached to the metal material by a platform and fasteners adapted to maintain the gap at a constant dimension.

11. The article of claim 1, wherein the high temperature environment is formed by combustion gases.

12. The article of claim 11, wherein the combustion gases are combusted in a turbine.

13. The article of claim 1, wherein the metal element is in direct contact with a flow of cool air.

14. A component of a gas turbine engine, comprising:
   a ceramic matrix composite composition having a frontside in direct contact with a high temperature environment and a backside, and coated with a ceramic insulating material on the frontside and coated with a temperature emissive coating on the backside; and
   a conductive metal element spaced apart from the ceramic matrix composition and defining an air gap between the metal element and ceramic matrix composite.

15. The article of claim 14, wherein the component is a combustion liner.

16. The article of claim 14, wherein the ceramic matrix composite material has a thickness of about 1–10 mm.

17. The article of claim 14, wherein the insulating coating has a thickness of about 2–15 mm.

18. The article of claim 14, wherein the emissive material has a thickness of greater than about 1.0 mm.

19. The article of claim 14, wherein the metal element has a thickness of about 1–10 mm.

20. The article of claim 14, wherein the air gap has a thickness of about 0.5–5 mm.

21. The article of claim 14, wherein the high temperature environment is formed by combustion gases within the gas turbine engine.

22. A combustion liner adopted for use in a combustion turbine engine, comprising:

a ceramic matrix composite composition having a frontside in direct contact with a high temperature environment and a backside, and coated with a ceramic insulating material on the frontside and coated with a temperature emissive coating on the backside;

a metal element spaced apart from the ceramic matrix composition and defining an air gap between the metal material and ceramic matrix composite; and a platform adapted to secure the ceramic matrix composition relative to the metal element and to maintain the air gap.

23. The combustion liner of claim 22, wherein the emissive coating has an emissivity greater than about 0.4 at 1,000° C.

24. The combustion liner of claim 22, wherein the emissive coating has an emissivity between about 0.6 to about 1.0 at 1,000° C.

* * * * *